(12) United States Patent
Tsai et al.

(10) Patent No.: US 9,383,787 B2
(45) Date of Patent: Jul. 5, 2016

(54) HEAT DISSIPATING MODULE

(71) Applicants: Ming-Fang Tsai, Taipei (TW); Ming-Hsiu Wu, Taipei (TW); Ching Ho, Taipei (TW); Yen-Chao Huang, Taipei (TW)

(72) Inventors: Ming-Fang Tsai, Taipei (TW); Ming-Hsiu Wu, Taipei (TW); Ching Ho, Taipei (TW); Yen-Chao Huang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 331 days.

(21) Appl. No.: 13/900,523

(22) Filed: May 22, 2013

(65) Prior Publication Data

US 2013/0319641 A1 Dec. 5, 2013

Related U.S. Application Data

(60) Provisional application No. 61/654,104, filed on Jun. 1, 2012.

(51) Int. Cl.
*G06F 1/20* (2006.01)

(52) U.S. Cl.
CPC ....................................... *G06F 1/20* (2013.01)

(58) Field of Classification Search
CPC ....... H01L 23/367; H01L 23/467; G06F 1/02; G06F 1/20
USPC ........ 165/80.3; 361/697, 709, 679.48, 679.49
See application file for complete search history.

(56) References Cited

U.S. PATENT DOCUMENTS

| | | | | |
|---|---|---|---|---|
| 6,871,702 | B2 * | 3/2005 | Horng et al. | 165/104.33 |
| 6,930,882 | B2 * | 8/2005 | Broder | G06F 1/20 165/104.33 |
| 6,989,988 | B2 * | 1/2006 | Arbogast et al. | 361/695 |
| 7,312,985 | B2 * | 12/2007 | Lee et al. | 361/679.48 |
| 7,719,931 | B2 * | 5/2010 | Kondo et al. | 369/44.26 |
| 7,782,614 | B2 | 8/2010 | Li et al. | |
| 7,872,866 | B1 * | 1/2011 | Wang | G06F 1/187 165/122 |
| 8,625,276 | B2 * | 1/2014 | Chen | G06F 1/20 361/679.48 |
| 2004/0004812 | A1 * | 1/2004 | Curlee | G06F 1/181 361/679.48 |
| 2005/0061477 | A1 * | 3/2005 | Mira | 165/80.3 |
| 2005/0161201 | A1 * | 7/2005 | Shiang-Chich | G06F 1/20 165/121 |
| 2006/0164808 | A1 * | 7/2006 | Stefanoski | G06F 1/20 361/700 |

(Continued)

FOREIGN PATENT DOCUMENTS

CN 2547003 4/2003

*Primary Examiner* — Tho V Duong
*Assistant Examiner* — Raheena Rehman
(74) *Attorney, Agent, or Firm* — Jianq Chyun IP Office

(57) ABSTRACT

A heat dissipating module disposed at a motherboard includes a fan, a air guiding cover, a first fin set and a second fin set. The fan provides cool air and is disposed in the air guiding cover. The air guiding cover includes a first air outlet, a second air outlet and an air guiding part connected between the first air outlet and the second air outlet. The first fin set is disposed at an upper surface of the motherboard and includes a plurality of first fins. The first air outlet covers at least a part of the first fins. The second fin set is disposed at a bottom surface opposite to the upper surface and extends to a side edge of the motherboard. The second fin set includes a plurality of second fins located beside the side edge, and the second air outlet covers the second fins.

6 Claims, 3 Drawing Sheets

(56) References Cited

U.S. PATENT DOCUMENTS

| | | | |
|---|---|---|---|
| 2007/0121291 A1* | 5/2007 | Wang et al. | 361/695 |
| 2007/0165374 A1* | 7/2007 | Chen | G06F 1/20 361/679.47 |
| 2007/0193720 A1* | 8/2007 | Horng et al. | 165/104.19 |
| 2008/0080143 A1* | 4/2008 | Peng | H01L 23/4006 361/719 |
| 2008/0117594 A1* | 5/2008 | Hwang et al. | 361/697 |
| 2009/0040718 A1* | 2/2009 | Liu | G06F 1/20 361/697 |
| 2009/0168330 A1* | 7/2009 | Li | G06F 1/20 361/679.47 |
| 2009/0321058 A1* | 12/2009 | Uchimura | H01L 23/427 165/121 |
| 2010/0025022 A1* | 2/2010 | Tien et al. | 165/121 |
| 2010/0067194 A1* | 3/2010 | Meyer, IV | F28D 15/0233 361/679.48 |
| 2010/0096112 A1* | 4/2010 | Zha et al. | 165/121 |
| 2010/0271774 A1* | 10/2010 | Peng | H01L 23/427 361/679.52 |
| 2010/0328878 A1* | 12/2010 | Fujiwara | 361/679.47 |
| 2011/0013356 A1* | 1/2011 | Wang | G06F 1/187 361/679.33 |
| 2012/0092830 A1* | 4/2012 | Fujiwara | 361/697 |
| 2012/0262879 A1* | 10/2012 | Inoue | G06F 1/20 361/697 |
| 2012/0262880 A1* | 10/2012 | Tsuchida | G06F 1/20 361/697 |

* cited by examiner

HEAT DISSIPATING MODULE

CROSS-REFERENCE TO RELATED APPLICATION

This application claims the priority benefit of U.S. provisional application Ser. No. 61/654,104, filed on Jun. 1, 2012. The entirety of the above-mentioned patent application is hereby incorporated by reference herein and made a part of specification.

BACKGROUND OF THE INVENTION

1. Field of the Invention

The invention relates to a heat dissipating module and, more particularly, to a heat dissipating module with a higher heat dissipating efficiency.

2. Description of the Related Art

As computer technology develops, an operating speed of a computer is improved, and a heating power of an electronic element in a host increases. Thus, the electronic element of the host needs a higher heat dissipating efficiency to prevent overheat and a temporary or a permanent damage to the electronic element. A heat dissipating module is usually disposed near a heat source of a high heating power, such as a central processing unit (CPU), a graphic chip, a north bridge chip and a south bridge chip, to reduce temperature of the heat source.

The heat dissipating module includes a fan and a heat dissipating fin set. The heat dissipating fin set is disposed in an outlet of the fan. The heat dissipating fin set includes a plurality of metal sheets arranged parallel to each other, and an interval exists between two adjacent metal sheets to dissipate heat. When the fan operates, cool air flows to the heat dissipating fin set through the outlet and brings heat away via convection to reduce the temperature in the electronic device.

Conventionally, the heat dissipating module disposed at a bottom surface of a motherboard includes a single fin set or cooling fins, and dissipates heat from the heat source at the bottom surface of the motherboard via natural convection. However, the efficiency of heat dissipation via natural convection is low, and heat accumulates at the surface of the motherboard, resulting in overheat of the motherboard and a damage of the electronic elements. Moreover, since the temperature of the heat dissipating fin set may be too high and the heat may be conducted to a casing of the electronic device, the casing temperature increases and the user feels uncomfortable when he or she contacts with the casing.

BRIEF SUMMARY OF THE INVENTION

A heat dissipating module with a higher heat dissipating efficiency is provided.

The heat dissipating module is adapted to be disposed at a motherboard and includes a fan, an air guiding cover, a first fin set and a second fin set. The fan provides cool air. The fan is disposed in the air guiding cover and includes a first air outlet, a second air outlet and an air guiding part connected between the first air outlet and the second air outlet.

The first fin set is disposed at an upper surface of the motherboard. The first fin set includes a plurality of first fins, and the first air outlet covers at least a part of the first fins. The second fin set is disposed at a bottom surface of the motherboard opposite to the upper surface and extends to a side edge. The second fin set includes a plurality of second fins. The second fins are located beside the side edge, and the second air outlet covers the second fins These and other features, aspects and advantages of the present invention will become better understood with regard to the following description, appended claims, and accompanying drawings.

DETAILED DESCRIPTION OF THE EMBODIMENTS

Figure 1:
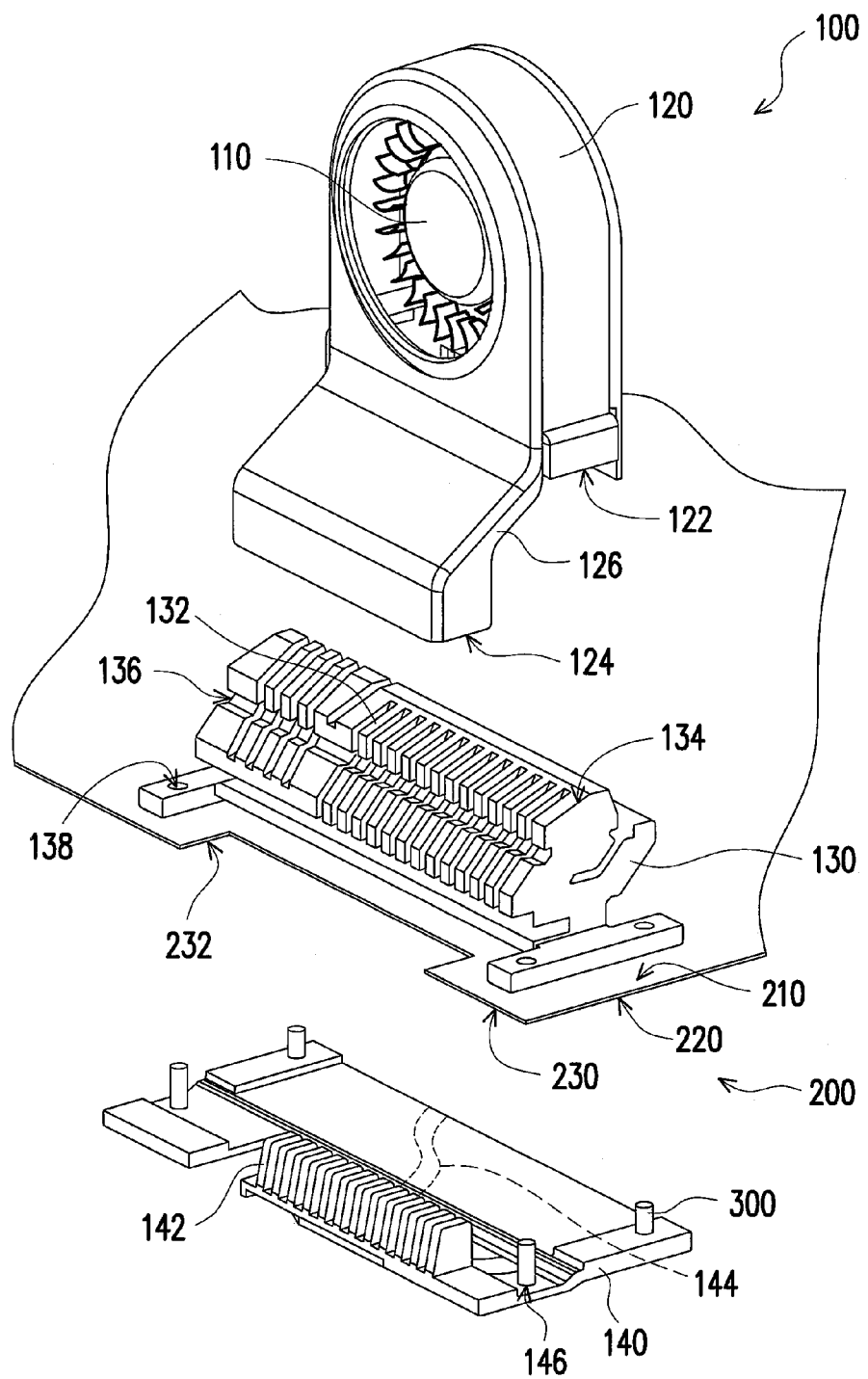
FIG. 1 is an exploded diagram showing a heat dissipating module and a motherboard in an embodiment.

FIG. 1 is an exploded diagram showing a heat dissipating module and a motherboard in an embodiment. Please refer to FIG. 1, in the embodiment, the heat dissipating module 100 is adapted to be disposed at the motherboard 200 of an electronic device.

The motherboard 200 has an upper surface 210, a bottom surface 220 opposite to the upper surface 210 and a side edge 230. The side edge 230 connects the upper surface 210 and the bottom surface 220, and the heat dissipating module 100 works on heat sources at the motherboard 200. The heat dissipating module 100 includes a fan 110, a air guiding cover 120, a first fin set 130 and a second fin set 140.

The fan 110 provides cool air and is disposed in the air guiding cover 120. The air guiding cover 120 includes a first air outlet 122, a second air outlet 124 and an air guiding part 126. The air guiding part 126 is connected between the first air outlet 122 and the second air outlet 124. The first fin set 130 includes a plurality of first fins 132, and the second fin set 140 includes a plurality of second fins 142.

Figure 2:
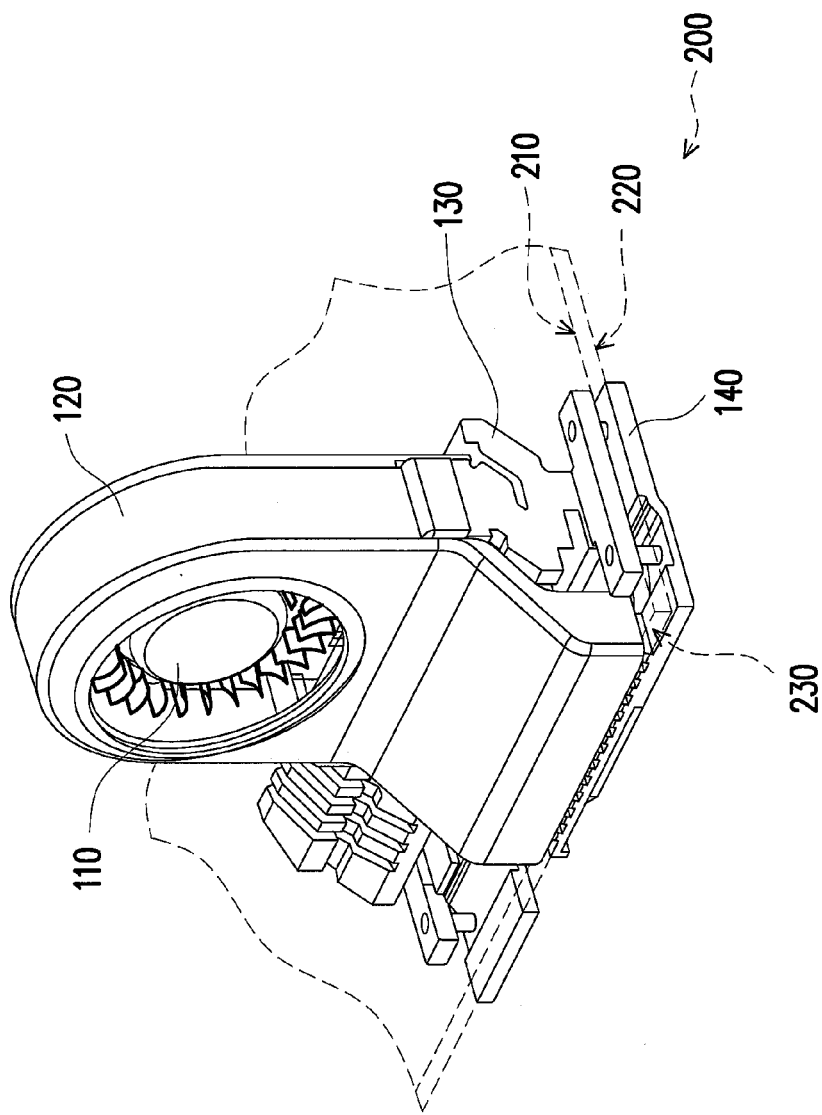
FIG. 2 is a schematic diagram showing an assembly of the heat dissipating module and the motherboard in FIG. 1.
Figure 3:
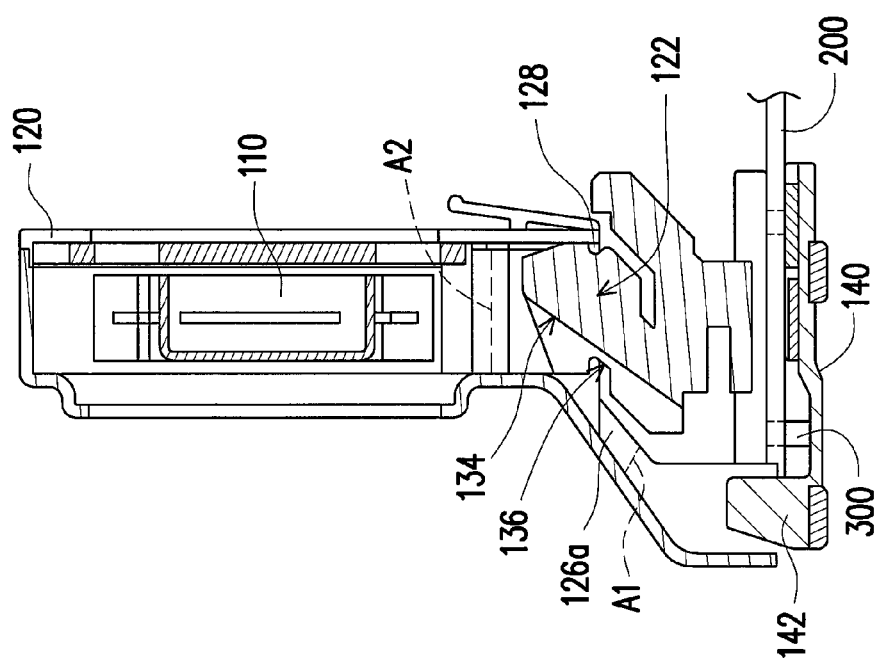
FIG. 3 is a sectional diagram showing the heat dissipating module and the motherboard in FIG. 2.

FIG. 2 is a schematic diagram showing an assembly of the heat dissipating module and the motherboard in FIG. 1. FIG. 3 is a sectional diagram showing the heat dissipating module and the motherboard in FIG. 2. The motherboard in FIG. 2 is shown in a dotted line in order to show the structure of the heat dissipating module under the motherboard. Please refer to FIG. 1 to FIG. 3, the first fin set 130 is disposed at the upper surface 210 of the motherboard 200, and the second fin set 140 is disposed at the bottom surface 220 of the motherboard 200 and extends to the side edge 230. The second fins 142 are located beside the side edge 230.

In the embodiment, the side edge 230 has gap 232, and the second fins 142 are located in the gap 232. When the second fin set 140 is combined with the motherboard 200, the second fins 142 almost align to the side edge of the motherboard 200.

As shown in FIG. 3, the first air outlet 122 covers at least a part of the first fins 132, and the second air outlet 124 covers the second fins 142. The cool air provided by the fan 110 flows to the first fins 132 via the first air outlet 122 to cool the first fins 132, and flows to the second air outlet 124 via the air guiding part 126 to cool the second fins 142.

The first fin set 130 further includes an air guiding slope 134. The air guiding slope 134 and the air guiding part 126 of the air guiding cover 120 define a guiding channel 126a to guide the cool air from the first air outlet 122 to the second air outlet 124. Moreover, an opening area A1 of the guiding channel 126a is smaller than an opening area A2 of the first air outlet 122, as shown in FIG. 3, so as to increase the flowing speed of the cool air when it flows from the first air outlet 122 to the guiding channel 126a, and improve the efficiency of heat exchange.

As shown in FIG. 3, the first fin set 130 may further includes a locking groove 136, and the air guiding cover 120 further includes a corresponding to the locking groove 136. The locker 128 locks to the locking groove 136 to fix the air guiding cover 120 to the first fin set 130.

Furthermore, the first fin set 130 may include multiple first fixing holes 138, as shown in FIG. 1, and the second fin set 140 includes multiple second fixing holes 146 corresponding to the first fixing holes 138. The fixing elements 300 pass through the first fixing holes 138 and the second fixing holes 146 to fix the first fin set 130 and the second fin set 140 to the motherboard 200. In the embodiment, the fixing elements 300 may be screw bolts, and the first fixing holes 138 and the second fixing holes 146 may be screw holes.

The first fin set 130 and the second fin set 140 may also be fixed at different positions of the motherboard in other ways, as long as the first air outlet 122 of the air guiding cover 120 can cover the first fin set 130 and the second air outlet 124 can cover the second fin set 140 to allow the cool air to pass the air guiding part 126 and cool the first fin set 130 and the second fin set 140.

Besides, as shown in FIG. 1, the second fin set 140 may further includes a heat pipe 144. One end of the heat pipe 144 is connected to at least one of the second fins 142, and the other end of the heat pipe 144 is connected to a heat source at the bottom surface 220 of the motherboard 200, so as to conduct the heat from the heat source to the second fins 142.

In sum, the first fin set and the second fin set are disposed at the upper surface and the bottom surface of the motherboard, respectively. The air guiding cover with the air guiding part guides the cool air from the fan to the first fin set via the first air outlet of the air guiding cover to cool the first fin set, and the cool air flows to the second air outlet which covers the second fin set via the air guiding part and cools the second fin set. Thus, the heat dissipating efficiency of the motherboard is improved, and the heat generated by the heat source at the bottom surface of the motherboard can be dissipated via the heat dissipating module rapidly.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A heat dissipating module adapted to be disposed at a motherboard, comprising:
   a fan used to provide cool air;
   an air guiding cover including a first air outlet, a second air outlet and an air guiding part connected between the first air outlet and the second air outlet, wherein the fan is disposed in the air guiding cover;
   a first fin set disposed at a surface of the motherboard, wherein the first fin set includes a plurality of first fins and an air guiding slope, the first air outlet covers at least a part of the first fins, and the air guiding slope and the air guiding part define a guiding channel to guide the cool air from the first air outlet to the second air outlet; and
   a second fin set disposed at another surface of the motherboard and extending to a side edge of the motherboard, wherein a top surface of the first fin set is located above a top surface of the second fin set, the air guiding slope slants toward the second fin set, the second fin set includes a plurality of second fins, the second fins are located at the side edge, the second air outlet covers the second fins, and a first direction of the air flowing out of the first air outlet is parallel to a second direction of the air flowing out of the second air outlet.

2. The heat dissipating module according to claim 1, wherein area of an opening of the guiding channel is smaller than area of an opening of the first air outlet.

3. The heat dissipating module according to claim 1, wherein the first fin set further includes a locking groove, the air guiding cover further includes a locker to lock into the locking groove and fix the air guiding cover to the first fin set.

4. The heat dissipating module according to claim 1, wherein the second fin set further includes a heat pipe, one end of the heat pipe is connected to at least one of the second fins, and the other end of the heat pipe is connected to a heat source at the motherboard.

5. The heat dissipating module according to claim 1, wherein the first fin set further includes a plurality of first fixing holes, the second fin set further includes a plurality of second fixing holes corresponding to the first fixing holes, and a plurality of fixing elements pass through the first fixing holes and the second fixing holes, respectively, to fix the first fin set and the second fin set to the motherboard.

6. The heat dissipating module according to claim 1, wherein the side edge of the motherboard includes a gap, the second fin set extends to the side edge and the second fins are located in the gap.

* * * * *